(12) United States Patent
Kim et al.

(10) Patent No.: US 8,107,048 B2
(45) Date of Patent: Jan. 31, 2012

(54) METHOD OF FABRICATING AN ARRAY SUBSTRATE FOR A LIQUID CRYSTAL DISPLAY DEVICE USING A SOFT MOLD

(75) Inventors: Jin Wuk Kim, Uiwang-si (KR); Tae Joon Song, Gyeonggi-Do (KR)

(73) Assignee: LG Display Co., Ltd., Seoul (KR)

( * ) Notice: Subject to any disclaimer, the term of this patent is extended or adjusted under 35 U.S.C. 154(b) by 651 days.

(21) Appl. No.: 12/005,615

(22) Filed: Dec. 28, 2007

(65) Prior Publication Data

US 2008/0246906 A1    Oct. 9, 2008

(30) Foreign Application Priority Data

Apr. 9, 2007    (KR) .................. 10-2007-0034743

(51) Int. Cl.
*G02F 1/1333* (2006.01)
*G02F 1/1335* (2006.01)
*G02F 1/1339* (2006.01)
(52) U.S. Cl. ......... 349/156; 349/106; 349/110; 349/158
(58) Field of Classification Search .......... 349/155–158, 349/106, 110; 216/24
See application file for complete search history.

(56) References Cited

U.S. PATENT DOCUMENTS

| | | | |
|---|---|---|---|
| 5,835,171 A | 11/1998 | Hanazawa et al. | |
| 6,462,802 B1 | 10/2002 | Nishimura et al. | |
| 7,098,986 B2 | 8/2006 | Park et al. | |
| 7,724,324 B2 * | 5/2010 | Chae et al. | 349/106 |
| 2003/0137621 A1 | 7/2003 | Zhang et al. | |
| 2005/0185130 A1 * | 8/2005 | Oh et al. | 349/156 |
| 2005/0231669 A1 * | 10/2005 | Kim | 349/138 |
| 2006/0197892 A1 * | 9/2006 | Fujiwara et al. | 349/113 |
| 2006/0203178 A1 | 9/2006 | Cho et al. | |
| 2006/0290025 A1 | 12/2006 | Chae et al. | |
| 2007/0002259 A1 | 1/2007 | Sangchul et al. | |
| 2007/0152372 A1 * | 7/2007 | Chae et al. | 264/320 |
| 2007/0165179 A1 * | 7/2007 | Jang | 349/156 |
| 2007/0284777 A1 * | 12/2007 | Kim et al. | 264/225 |
| 2009/0139960 A1 * | 6/2009 | Kim et al. | 216/24 |

FOREIGN PATENT DOCUMENTS

| | | |
|---|---|---|
| CN | 1940661 | 4/2007 |
| JP | 2005-122150 | 5/2005 |
| WO | WO 2007/089638 A2 | 8/2007 |

* cited by examiner

*Primary Examiner* — Huyen Ngo

(74) *Attorney, Agent, or Firm* — McKenna Long & Aldridge LLP

(57) ABSTRACT

A liquid crystal display device and a method of fabricating the same is disclosed, to provide a liquid crystal display device to simplify the process and decrease the fabrication cost, the liquid crystal display device includes a first substrate having a color filter and a second substrate having a thin film transistor, wherein the first and second substrates face each other, a first passivation film formed on the thin film transistor, and a first column spacer formed integrally with the first passivation film.

6 Claims, 19 Drawing Sheets

METHOD OF FABRICATING AN ARRAY SUBSTRATE FOR A LIQUID CRYSTAL DISPLAY DEVICE USING A SOFT MOLD

This application claims the benefit of Korean Patent Application No. 2007-0034743 filed on Apr. 9, 2007, which is hereby incorporated by reference for all purposes as if fully set forth herein.

BACKGROUND OF THE INVENTION

1. Field of the Invention

The present invention relates to display devices and more particularly to a liquid crystal display device and a method of fabricating the same.

2. Discussion of the Related Art

Recently, various mobile-type electronic devices, such as mobile phones, PDAs, notebook computers, have become widely used, and there is increasing demand for a thin and light flat panel display device. Examples of flat panel display devices include liquid crystal display (LCD) devices, plasma display panels PDP, field emission displays FED, and vacuum fluorescent displays VFD. Among the various examples of flat panel display devices, the liquid crystal display (LCD) device has attracted great attention due to advantages such as its suitability for mass production, simple driving means, and high resolution and picture quality.

FIG. 1 is a cross section view illustrating a liquid crystal display device according to the related art. As shown in FIG. 1, the liquid crystal display device 1 according to the related art includes a lower substrate 5, an upper substrate 3, and a liquid crystal layer 7 formed between the lower substrate 5 and the upper substrate 3.

The lower substrate 5 corresponds to a thin film transistor array substrate, which includes a plurality of pixel regions, wherein a thin film transistor is formed in each of the pixel region.

The upper substrate 3 corresponds to a color filter substrate, which includes a color filter layer to realize colors.

Pixel electrodes and a common electrode are formed on the lower substrate 5 and the upper substrate 3, respectively. In addition, the lower and upper substrates 5 and 3 are coated with alignment films to align liquid crystal molecules included in the liquid crystal layer 7.

Spacers 9 are provided between the lower substrate 5 and the upper substrate 3, to maintain a cell gap therebetween. The liquid crystal layer 7 is formed between the lower substrate 5 and the upper substrate 3. Accordingly, as the liquid crystal molecules included in the liquid crystal layer 7 are driven by the thin film transistors formed on the lower substrate 5, an amount of light passing through the liquid crystal layer is controlled so that information is displayed.

The liquid crystal display device uses electro-optic effects resulting from anisotropy of the liquid crystal associated with the alignment of liquid crystal molecules. Accordingly, the display stability of a liquid crystal display device is largely affected by the control of the alignment of liquid crystal molecules.

The processes for forming the alignment film to align the liquid crystal molecules and for forming the spacers to maintain the cell gap with a seal pattern greatly affect the picture quality in the liquid crystal cell.

When the spacers are scattered by a related art method, the spacers may exist in the pixel region through which light is transmitted to display an image. The spacers in the pixel region may disturb the alignment of liquid crystal, and may lower an aperture ratio of the liquid crystal cell. Accordingly, the density of spacers is controlled to be below a predetermined level. Additionally, it is desirable to uniformly distribute the spacers over an entire screen.

A high density of spacers is useful for maintaining the cell gap between the two substrates. Employing a high density of spacers may deteriorate the ability of the display to display black, lowering a contrast ratio of the display because the spacers cause dispersion of light and disorder of the alignment of liquid crystal in the area surrounding the spacer.

In order to overcome this problem, a method of providing column spacers has been proposed recently in which the spacers are directly patterned on the lower or upper substrate. The column spacers of the related art can be fabricated by depositing or coating organic polymer material on a substrate and carrying out photolithography to selectively remove portions of the deposited or coated organic polymer material.

Photolithography includes coating, exposure and development of photoresist, thereby requiring using an additional mask resulting in a more complex manufacturing process and in an increase in manufacturing costs.

SUMMARY OF THE INVENTION

Accordingly, the present invention is directed to a liquid crystal display device and a method of fabricating the same that substantially obviates one or more of the problems due to limitations and disadvantages of the related art.

An advantage of the present invention is to provide a liquid crystal display device to simplify the process and decrease the fabrication cost, and a method of fabricating the same.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve and other advantages and in accordance with the purpose of the invention, as embodied and broadly described herein, a liquid crystal display device includes a first substrate having a color filter and a second substrate having a thin film transistor, wherein the first and second substrates face each other, a first passivation film formed on the thin film transistor, and a first column spacer formed integrally with the first passivation film.

In another aspect of the present invention, a method of fabricating a liquid crystal display device includes preparing a first substrate having a color filter, forming a thin film transistor on a second substrate facing the first substrate, forming a pattern material layer on the second substrate including the thin film transistor, aligning a soft mold with the second substrate including the pattern material layer, forming a contact hole, a first passivation film and a first column spacer by contacting the soft mold with the pattern material layer, separating the soft mold from the pattern material layer; and forming a pixel electrode that connects to the thin film transistor via the contact hole.

In another aspect of the present invention a method of fabricating an array substrate for a liquid crystal display device includes forming a thin film transistor on a substrate, forming a pattern material layer on the substrate including the thin film transistor, aligning a soft mold with the substrate including the pattern material layer, forming a contact hole, a first passivation film and a first column spacer by contacting the soft mold to the pattern material layer, separating the soft mold from the pattern material layer, and forming a pixel electrode that connects to the thin film transistor via the contact hole.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts.

Hereinafter, a liquid crystal display device according to the present invention and a method of fabricating the same will be explained with reference to the accompanying drawings.

Figure 1:
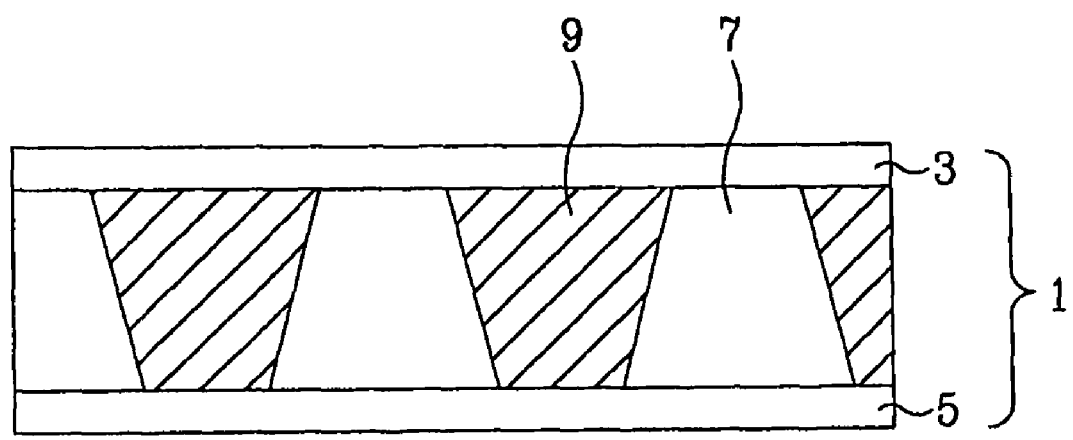
FIG. 1 is a cross section diagram illustrating a related art liquid crystal display device.
Figure 2:
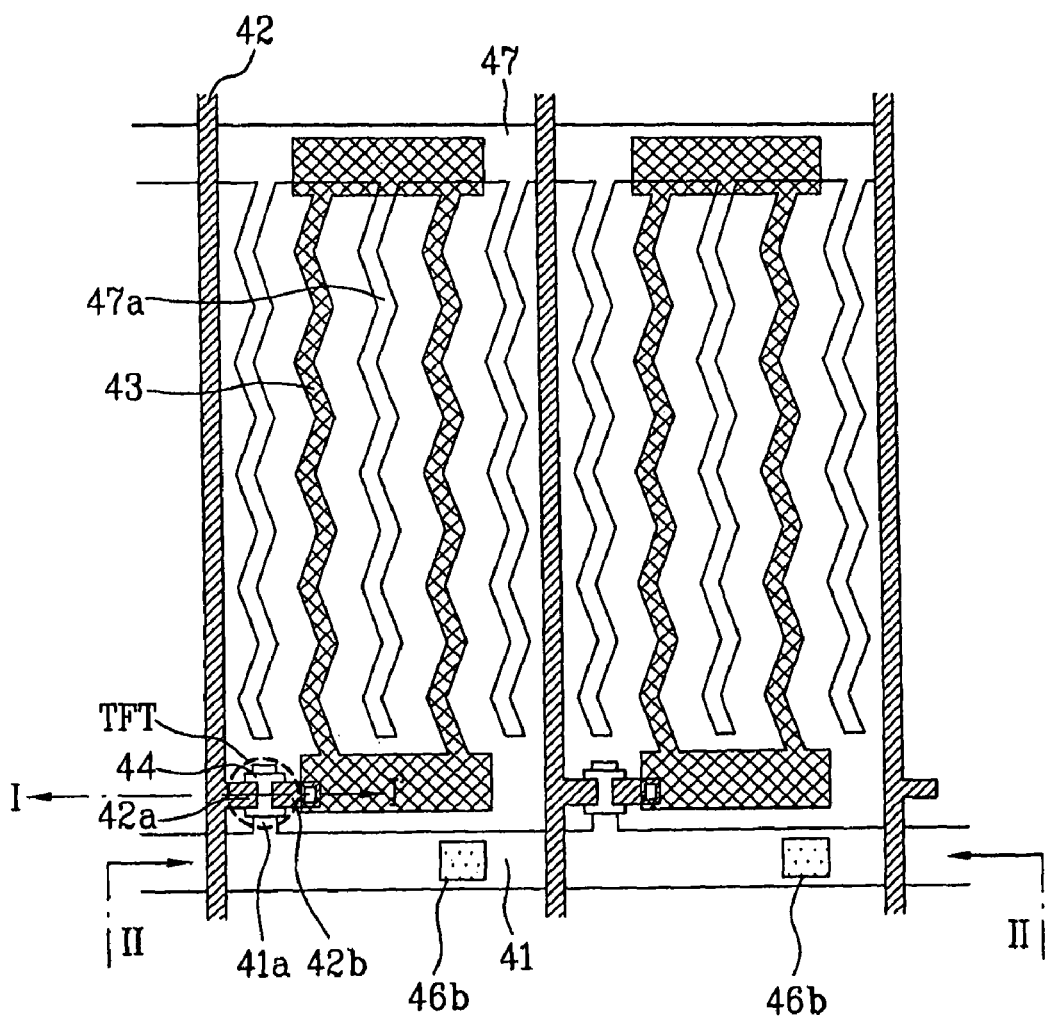
FIG. 2 is a plan diagram illustrating one liquid crystal display device according to the present invention.
Figure 3:
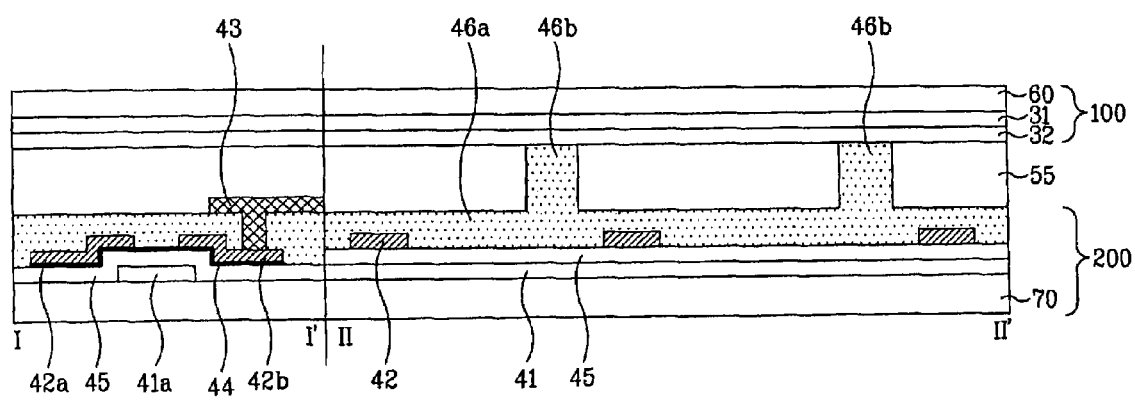
FIG. 3 is a cross section diagram illustrating a liquid crystal display device according to the first embodiment of the present invention, along I-I' and II-II' of FIG. 2.

FIG. 2 is a plan diagram illustrating a liquid crystal display device according to the present invention. FIG. 3 is a cross section diagram illustrating a liquid crystal display device according to the first embodiment of the present invention, along I-I' and II-II' of FIG. 2.

As shown in FIGS. 2 and 3, the liquid crystal display device according to the first embodiment of the present invention includes a color filter substrate 100, a thin film transistor (TFT) substrate 200, and a liquid crystal layer 55 formed by injecting liquid crystal into a space between the color filter substrate 100 and the TFT substrate 200.

The color filter substrate 100 includes a black matrix layer 31 and a R/G/B color filter layer 32 on a substrate 60, wherein the black matrix layer 31 prevents light from leaking through regions other than the pixel regions (e.g. regions of gate line, data line and thin film transistor), and the R/G/B color filter layer 32 provided in the pixel regions to realize colors for an image. In addition, an overcoat layer (not shown) is formed on an entire surface of the black matrix layer 31 and the R/G/B color filter layer 32.

The TFT substrate 200 is disposed opposite the color filter substrate and includes a plurality of gate lines 41 and a plurality of data lines 42 on a substrate 70, wherein each gate line 41 is orthogonal to each data line 42 to thereby define each pixel region. In addition, a common line 47 is formed in parallel to the gate line 41, and common electrodes 47a are diverged from the common line 47 toward the inside of pixel region, wherein the common electrodes 47a are formed at fixed intervals. At each crossing of the gate and data lines 41 and 42, there is a thin film transistor TFT including source and drain electrodes 42a and 42b. Pixel electrodes 43 are connected to the drain electrode of the thin film transistor within the pixel region, wherein the pixel electrodes 43 alternate with and are substantially parallel to the common electrodes 47a within the pixel region.

The substrates 60 and 70 may be formed of glass or plastic. A gate insulation film 45 is formed between the gate line 41 and the data line 42. A semiconductor layer 44 is formed on the gate insulation film 45 above the gate electrode 41a. A passivation film 46a is formed between the thin film transistor TFT and the pixel electrode 43. Simultaneously with the forming of the passivation film 46a, a column spacer 46b is formed of the same material as the passivation film 46a.

The column spacer 46b maintains a cell gap between the two substrates when the column spacer 46b is brought into contact with the color filter substrate 100. The passivation film 46a and the column spacer 46b are formed as an integral body by depositing an organic insulation material of ultraviolet curable liquid pre-polymer on the substrate 70 including the thin film transistor TFT, and carrying out In-Plane Printing using a soft mold provided with a pattern having an inverted shape corresponding to the shapes of the passivation film 46a and the column spacer 46b.

Accordingly, the liquid crystal display device according to the first embodiment of the present invention includes the passivation film 46a and the column spacer 46b which are formed by the In-Plane Printing using a soft mold. In comparison to a related art process of forming a column spacer by photolithography using coating, exposure and development of photoresist, the In-Plane Printing using the soft mold process can realize a simpler process with a lower fabrication cost.

FIGS. 4A to 4D are cross section diagrams illustrating a method of fabricating the liquid crystal display device according to the first embodiment of the present invention.

Figure 4A:
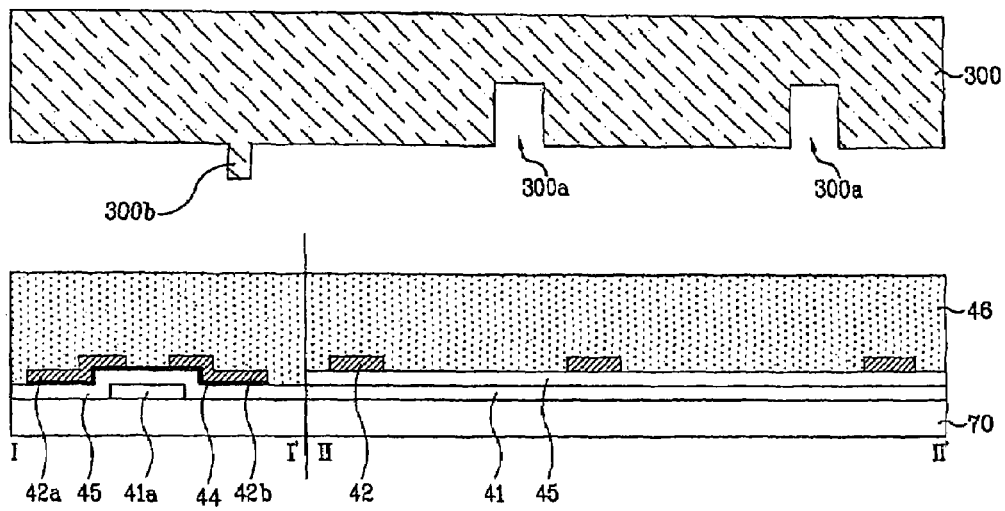
FIGS. 4A to 4D are cross section diagrams illustrating a method of fabricating a liquid crystal display device according to the first embodiment of the present invention.

Referring to FIG. 4A, after forming a gate metal layer on the substrate 70, the gate metal layer is patterned by photolithography, thereby forming gate patterns including the gate line 41 and a gate electrode 41a, as shown in FIG. 4A. The gate insulation film 45 is formed on the substrate 70 including the gate patterns.

Subsequently, a layer of n+-type amorphous silicon is formed on the substrate 70 including the gate insulation film 45, and the n+-type amorphous silicon layer is then patterned by photolithography to form the semiconductor layer 44. The semiconductor layer 44 is formed in a double-layered structure including an active layer and an ohmic contact layer. A source/drain metal layer is formed on the substrate 70 including the semiconductor layer 44, and is patterned by photolithography to form source/drain patterns including the data line 42, and the source and drain electrodes 42a and 42b. A pattern material layer 46 is formed on the substrate 70 including the source/drain patterns.

The pattern material layer 46 includes ultra-violet curable liquid pre-polymer, photo-initiator and surfactant. Typically, the ultra-violet curable liquid pre-polymer uses a ultra-violet curable acrylate pre-polymer such as, HEA (2-Hydroxyehyl acrylate), EGDMA (Ethyleneglycol dimethancrylate), EGPEA (Ethyleneglycol phenyletheracrylate), HPA (Hydroxypropyl acrylate), and HPPA (Hydroxyl phenoxypropyl acrylate).

A soft mold 300 is prepared. The rear surface of the soft mold 300 is provided with a backplane and the front surface is provided with embossing patterns 300b and depressed patterns 300a and positioned above the substrate including the pattern material layer 46. The soft mold 300 may be fabricated by curing an elastic polymer such as PDMS (polydimethylsiloxane). Alternatively, the soft mold 300 may be formed of polyurethane or polyimide. The soft mold 300 is provided with the embossing pattern 300b for forming a contact hole, and the depressed pattern 300a for formation of the column spacer.

Figure 4B:
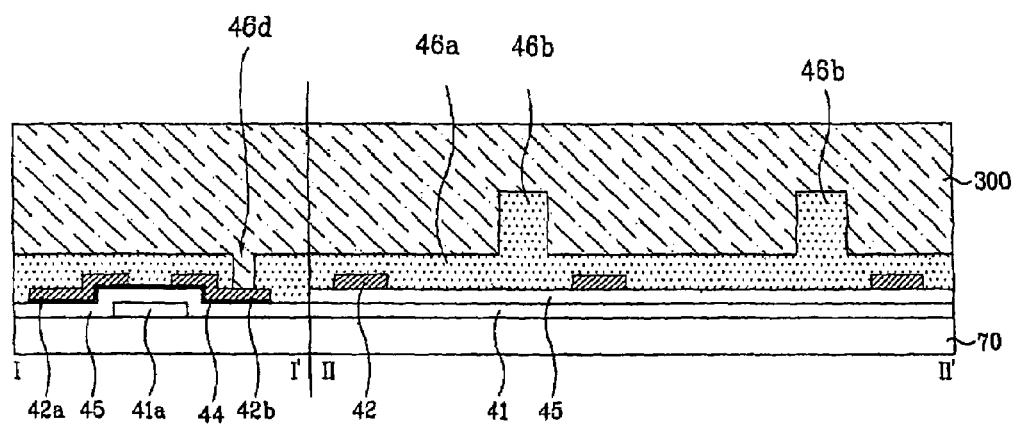

As shown in FIG. 4B, after aligning the soft mold 300 and the substrate 70 having the pattern material layer 46, the surface of soft mold 300 is brought into contact with the pattern material layer 46 to thereby form the passivation film 46a, the column spacer 46b, and the contact hole 46d for exposing the drain electrode 42b in the pattern material layer 46. The column spacer 46b corresponds to the depressed pattern 300a of the soft mold 300, and the contact hole 46d corresponds to the embossing pattern 300b of the soft mold 300. While the soft mold 300 is in contact with the pattern material layer 46, heat or light is applied thereto to thereby cure the pattern material layer 46.

Figure 4C:
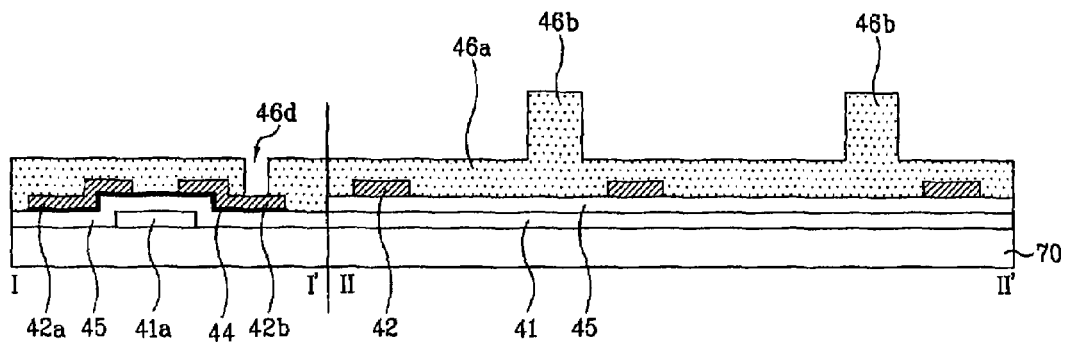
Figure 4D:
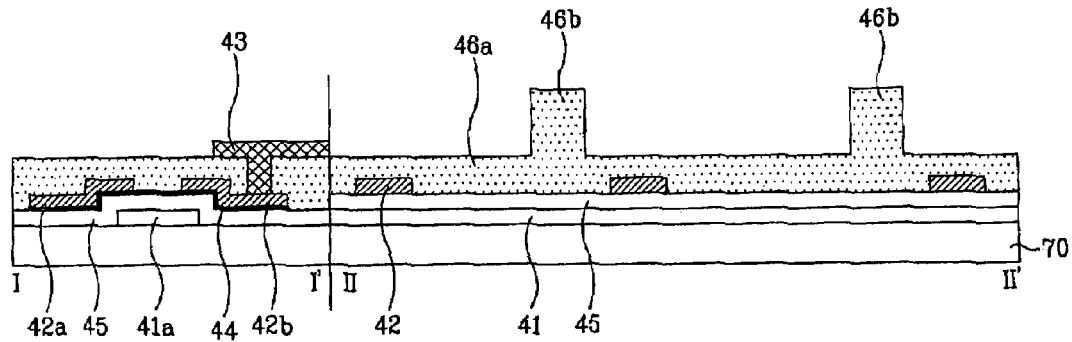

As shown in FIG. 4C, the soft mold 300 is separated from the passivation film 46a including the contact hole 46d and the pattern material layer 46 having the column spacer 46b. Next, as shown in FIG. 4D, a transparent conductive film is formed on the passivation film 46a having the contact hole 46d, and a transparent conductive film is patterned by photolithography to form the pixel electrode 43 connected to the drain electrode 42b.

Accordingly, the passivation film 46a and the column spacer 46b are formed by In-Plane Printing using the soft mold. In comparison to a related art process of forming a column spacer by photolithography using coating, exposure and development of photoresist, the In-Plane Printing using the soft mold can realize a simpler process with decreased fabrication cost.

A liquid crystal display device provided with a passivation film having a double-layered structure and a cell-gap column spacer and a method of fabricating the same will be explained as follows.

Figure 5:
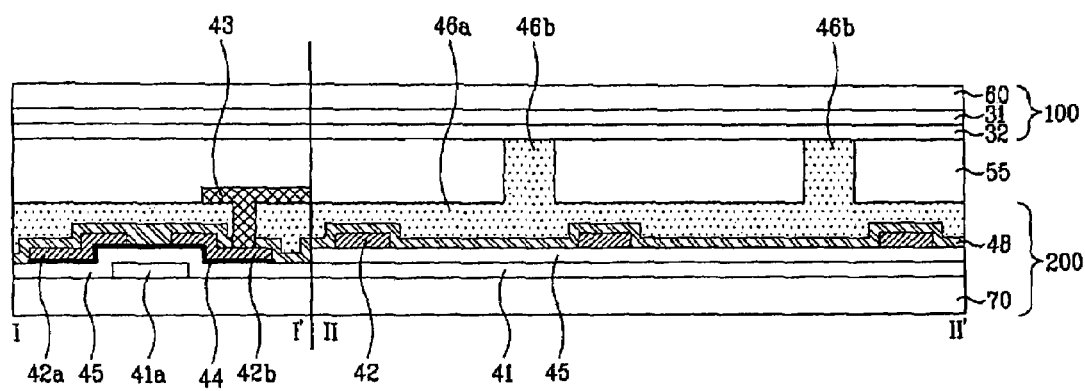
FIG. 5 is a cross section diagram illustrating a liquid crystal display device according to the second embodiment of the present invention, along I-I' and II-II' of FIG. 2.

FIG. 5 is a cross section diagram illustrating a liquid crystal display device according to a second embodiment of the present invention, along I-I' and II-II' of FIG. 2.

First, as shown in FIGS. 2 and 5, the liquid crystal display device according to the second embodiment of the present invention includes a color filter substrate 100, a TFT substrate 200, and a liquid crystal layer 55 formed by injecting liquid crystal into a space between the color filter substrate 100 and the TFT substrate 200.

The color filter substrate 100 includes a substrate 60, a black matrix layer 31, an R/G/B color filter layer 32, and an overcoat layer (not shown). The TFT substrate 200 positioned opposite the color filter substrate 100 includes a substrate 70, a gate line 41, a data line 42, a common line 47, a common electrode 47a, source and drain electrodes 42a and 42b, a pixel electrode 43, a gate insulation film 45, and a semiconductor layer 44. The substrates 60 and 70 may be formed of glass or plastic.

In addition, a first passivation film 48 and a second passivation film 46a are formed between the thin film transistor TFT and the pixel electrode 43. Simultaneously with forming the second passivation film 46a, a column spacer 46b is formed of the same material as the second passivation film 46a. The column spacer 46b maintains a cell gap between the two substrates when the column spacer 46b is brought into contact with the color filter substrate 100. The column spacers 57 are provided at fixed intervals on the gate line 41.

The first passivation film 48 is formed of an inorganic insulation material such as $SiN_x$, to thereby improve the interfacial stability between the second passivation film 46a of organic insulation material including photo ultra-violet curable liquid pre-polymer and the source and drain electrodes 42a and 42b/data line 42/gate insulation film 45. The second passivation film 46a and the column spacer 46b are formed as an integral body by depositing an organic insulation material of ultra-violet curable liquid pre-polymer on the substrate 70 including the thin film transistor TFT and the first passivation film 48, and carrying out In-Plane Printing using a soft mold provided with a pattern having an inverted shape of the second passivation film 46a and the column spacer 46b.

Accordingly, the liquid crystal display device according to the second embodiment of the present invention includes the second passivation film 46a and the column spacer 46b which are formed by the In-Plane Printing using the soft mold. In comparison to a related art process of forming a column spacer by photolithography using coating, exposure and development of photoresist, the In-Plane Printing using the soft mold can realize a simpler process with decreased fabrication cost. Furthermore, since the first passivation film 48 of inorganic insulation material is formed under the second passivation film 46a, the interfacial stability is improved between the second passivation film 46a of organic insulation material and the contacting layers.

FIGS. 6A to 6E are cross section diagrams illustrating a method of fabricating a liquid crystal display device according to the second embodiment of the present invention.

Figure 6A:
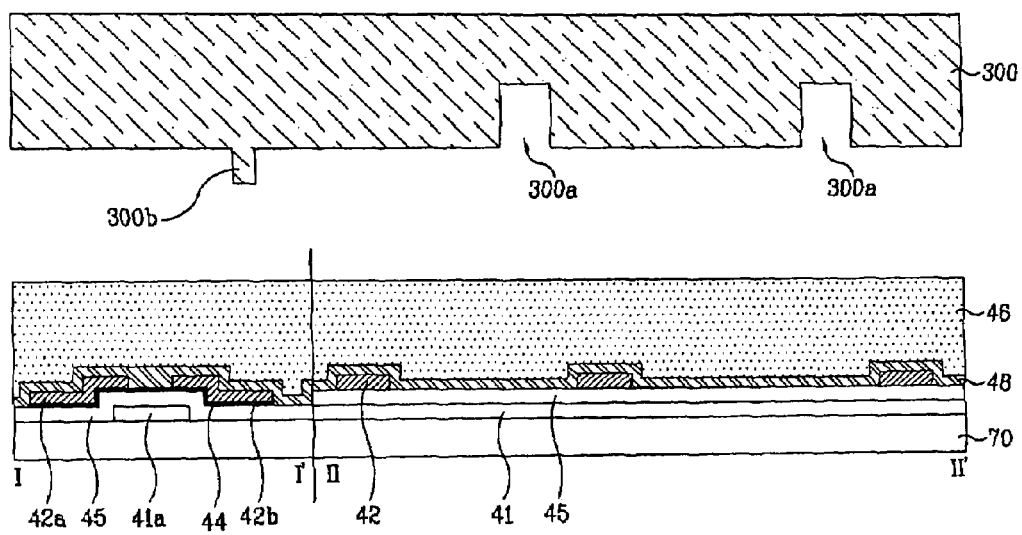
FIGS. 6A to 6E are cross section diagrams illustrating a method of fabricating a liquid crystal display device according to the second embodiment of the present invention.

As shown in FIG. 6A, a gate pattern including the gate line 41 and a gate electrode 41a, the gate insulation film 45; the semiconductor layer 44, and source/drain patterns including the data line 42 and the source and drain electrodes 42a and 42b are formed the substrate 70. The first passivation film 48 of inorganic insulation material, for example, $SiN_x$ is formed on the substrate 70, and a pattern material layer 46 is formed on the first passivation film 48.

Thereafter, a soft mold 300 is prepared having a rear surface provided with a backplane and a front surface provided with embossing patterns 300b and depressed patterns 300a and positioned above the substrate 70 including the pattern material layer 46. The soft mold 300 is provided with the embossing pattern 300b for forming the contact hole, and the depressed pattern 300a for forming the column spacer.

Figure 6B:
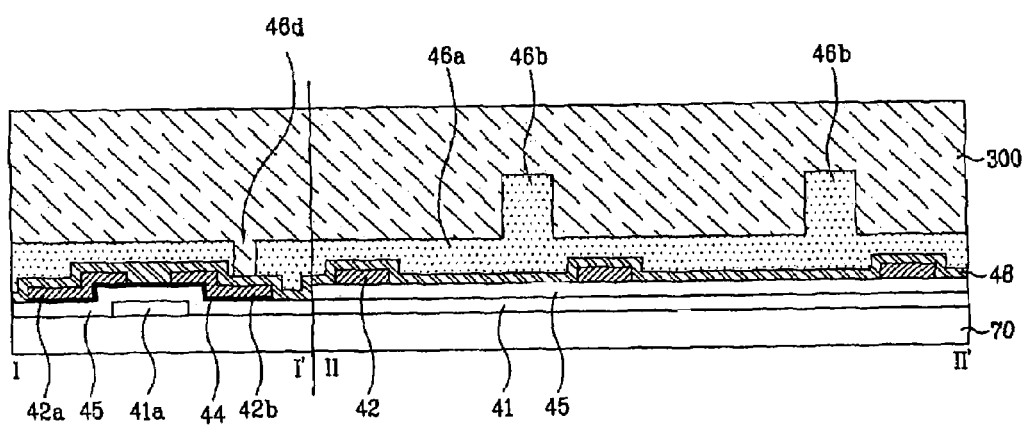

As shown in FIG. 6B, after aligning the soft mold 300 and the substrate 70 having the pattern material layer 46, the front surface of soft mold 300 is brought into contact with the pattern material layer 46, thereby forming the second passivation film 46a, the column spacer 46b and the contact hole 46d for exposing the drain electrode 42b in the pattern material layer 46, wherein the column spacer 46b corresponds to the depressed pattern 300a of the soft mold 300, and the contact hole 46d corresponds to the embossing pattern 300b of the soft mold 300. While the soft mold 300 is in contact with the pattern material layer 46, heat or light is applied thereto to thereby cure the pattern material layer 46.

Figure 6C:
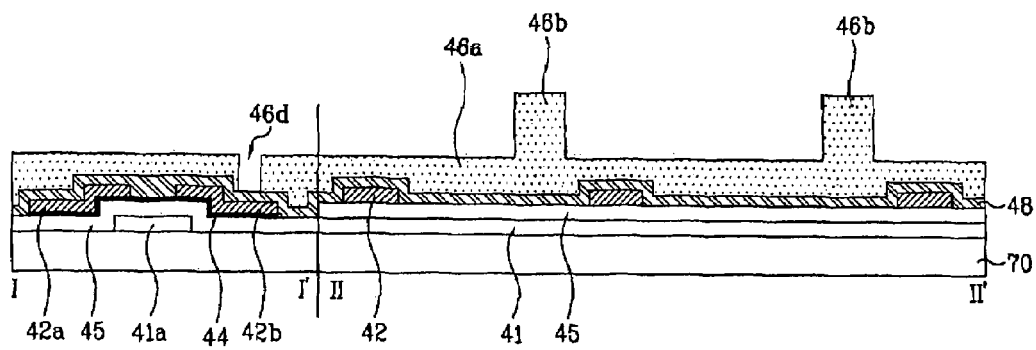

Next, as shown in FIG. 6C, the soft mold 300 is separated from the second passivation film 46a having the contact hole 46d and the pattern material layer 46 having the column spacer 46b.

Figure 6D:
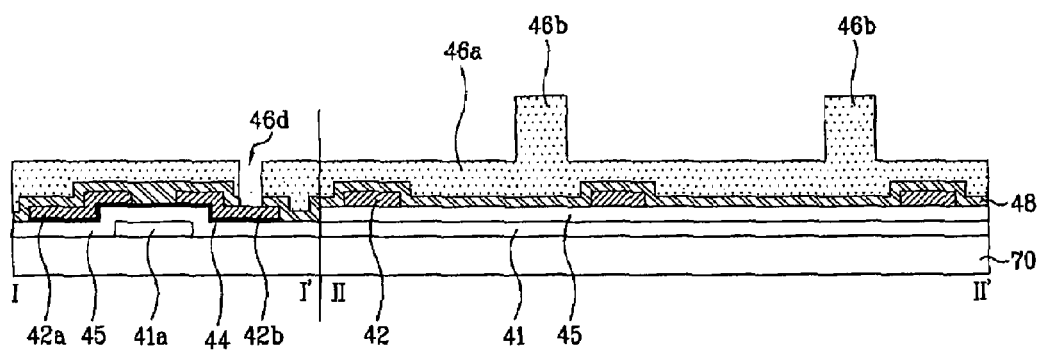

As shown in FIG. 6D, an etching process is performed using the second passivation film 46a having the contact hole 46d as an etching mask to thereby form the contact hole 46d in the first passivation layer 48 for exposing the drain electrode 42b.

Figure 6E:
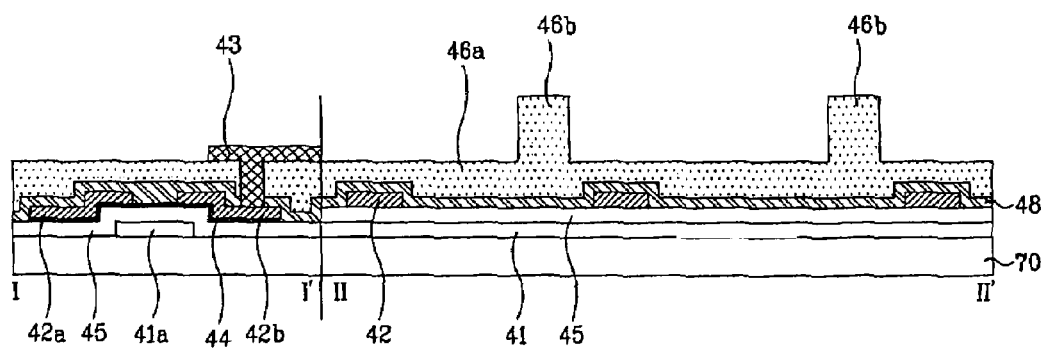

As shown in FIG. 6E, a transparent conductive film is formed on the substrate 70 including the contact hole 46d, and the transparent conductive film is patterned by photolithography to form the pixel electrode 43 connected to the drain electrode 42b.

Accordingly, the liquid crystal display device according to the second embodiment of the present invention includes the second passivation film 46a and the column spacer 46b formed by In-Plane Printing using the soft mold. In comparison to a related art process of forming a column spacer by photolithography using coating, exposure and development of photoresist, the In-Plane Printing using the soft mold can realize a simpler process with decreased fabrication cost. Furthermore, the first passivation film 48 of inorganic insulation material is formed under the second passivation film 46a of organic insulation material to thereby improve the interfacial stability between the second passivation film 46a of organic insulation material and the contacting layers.

A liquid crystal display device provided with a passivation film having a three-layered structure and a cell-gap column spacer and a method of fabricating the same will be explained as follows.

Figure 7:
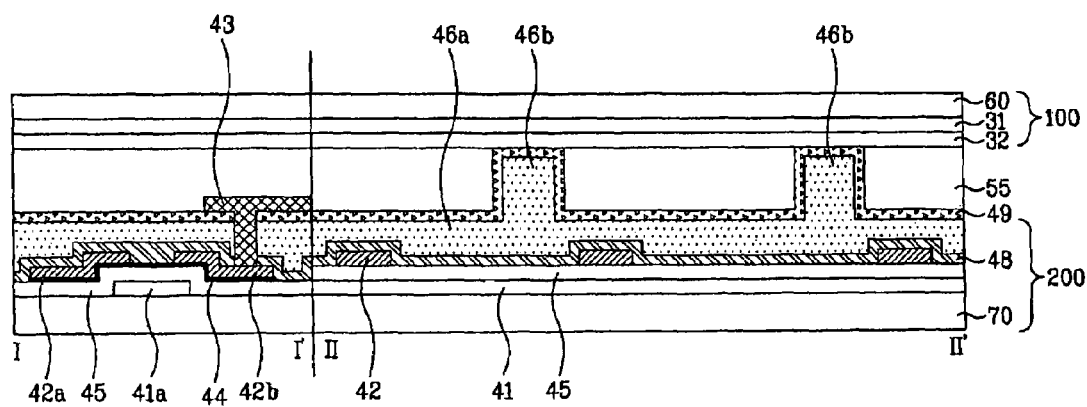
FIG. 7 is a cross section diagram illustrating a liquid crystal display device according to the third embodiment of the present invention, along I-I' and II-II' of FIG. 2.

FIG. 7 is a cross section diagram illustrating a liquid crystal display device according to the third embodiment of the present invention, along I-I' and II-II' of FIG. 2.

As shown in FIGS. 2 and 7, the liquid crystal display device according to the third embodiment of the present invention includes a color filter substrate 100, a TFT substrate 200, and a liquid crystal layer 55 formed by injecting liquid crystal into a space between the color filter substrate 100 and the TFT substrate 200.

The color filter substrate 100 includes a substrate 60, a black matrix layer 31, an R/G/B color filter layer 32, and an overcoat layer (not shown). The TFT substrate 200 positioned opposite to the color filter substrate 100 includes a substrate 70, a gate line 41, a data line 42, a common line 47, a common electrode 47a, source and drain electrodes 42a and 42b, a pixel electrode 43, a gate insulation film 45, and a semiconductor layer 44. The substrates 60 and 70 may be formed of glass or plastic.

In addition, a first passivation film 48, a second passivation film 46a and a third passivation film 49 are formed between the thin film transistor TFT and the pixel electrode 43, and simultaneously with forming the second passivation film 46a, a column spacer 46b is formed of the same material as the second passivation film 46a. The column spacer 46b maintains a cell gap between the two substrates when the column spacer 46b is brought into contact with the color filter substrate 100.

The first and third passivation films 48 and 49 are formed of an inorganic insulation material such as $SiN_x$. Thus, the first passivation film 48 is provided to improve the interfacial stability between the second passivation film 46a of organic insulation material including photo ultra-violet curable liquid pre-polymer and the source and drain electrodes 42a and 42b/data line 42/gate insulation film 45. The third passivation film 49 is provided to improve the interfacial stability between the second passivation film 46a and the pixel electrode 43.

The second passivation film 46a and the column spacer 46b are formed as an integral body by depositing an organic insulation material of ultra-violet curable liquid pre-polymer on the substrate 70 including the thin film transistor TFT, and carrying out In-Plane Printing using a soft mold provided with a pattern having an inverted shape of the second passivation film 46a and the column spacer 46b.

Accordingly, the liquid crystal display device according to the third embodiment of the present invention includes the second passivation film 46a and the column spacer 46b which are formed by the In-Plane Printing using the soft mold. In comparison to a related art process of forming a column spacer by photolithography using coating, exposure and development of photoresist, the In-Plane Printing using the soft mold can realize a simpler process with decreased fabrication cost. Furthermore, since the first and third passivation film 48 and 49 of inorganic insulation material are respectively formed on and under the second passivation film 46a, the interfacial stability is improved between the second passivation film 46a of organic insulation material and the contacting layers.

Figure 8A:
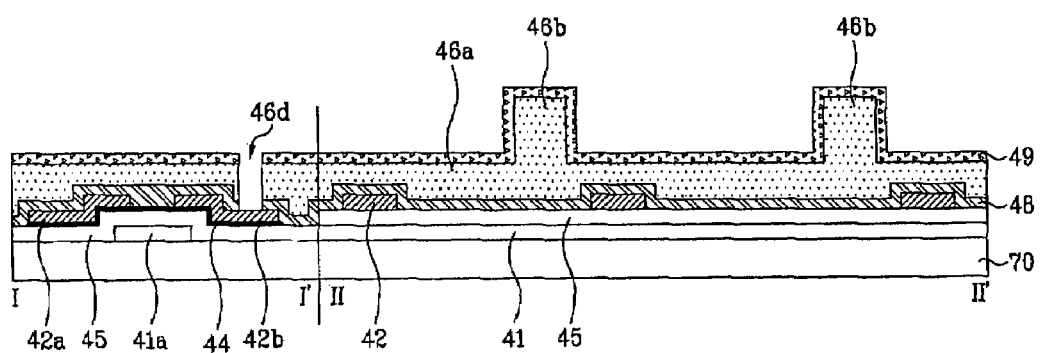
FIGS. 8A and 8B are cross section diagrams illustrating a method of fabricating a liquid crystal display device according to the third embodiment of the present invention.

A method of fabricating the liquid crystal display device according to the present invention will be explained with reference to FIGS. 8A and 8B.

The process up until forming the column spacer 46b, the passivation film 46a and the contact hole 46d for exposing the drain electrode 42b is same as the process of FIGS. 6A to 6D according to the second embodiment of the present invention. Thereafter, as shown in FIG. 8A, the third passivation film 49 of inorganic insulation material, for example, $SiN_x$ is formed on the second passivation film 46a.

Figure 8B:
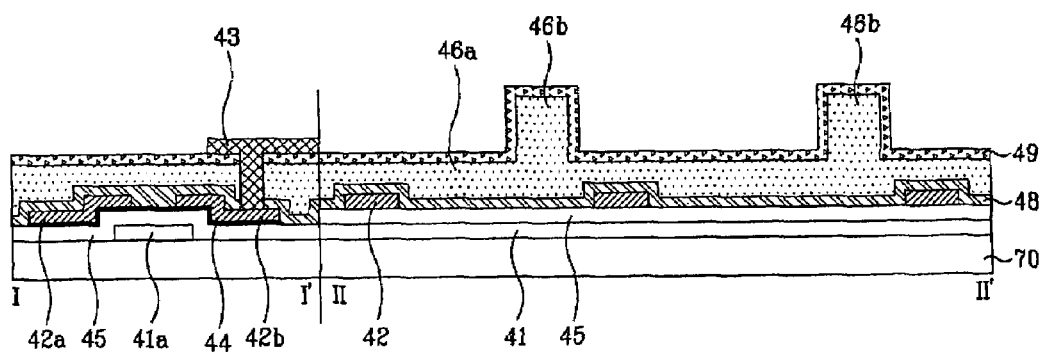

Then, as show in FIG. 8B, a transparent conductive film is formed on the substrate 70 including the contact hole 46d, and is then patterned by photolithography, thereby forming the pixel electrode 43 connected to the drain electrode 42b, and completing the process.

Accordingly, the liquid crystal display device according to the third embodiment of the present invention includes the second passivation film 46a and the column spacer 46b formed by In-Plane Printing using the soft mold. In comparison to a related art process of forming a column spacer by photolithography using coating, exposure and development of photoresist, the In-Plane Printing using the soft mold can realize a simpler process with decreased fabrication cost. Furthermore, the first and third passivation films 48 and 49 of inorganic insulation material are respectively formed on and under the second passivation film of organic insulation material, thereby improving the interfacial stability between the second passivation film 46a and the contacting layers.

A liquid crystal display device provided with a compression prevention column spacer 46c as well as a cell-gap column spacer 46b and a method of fabricating the same will be explained with reference to the accompanying drawings.

Figure 9:
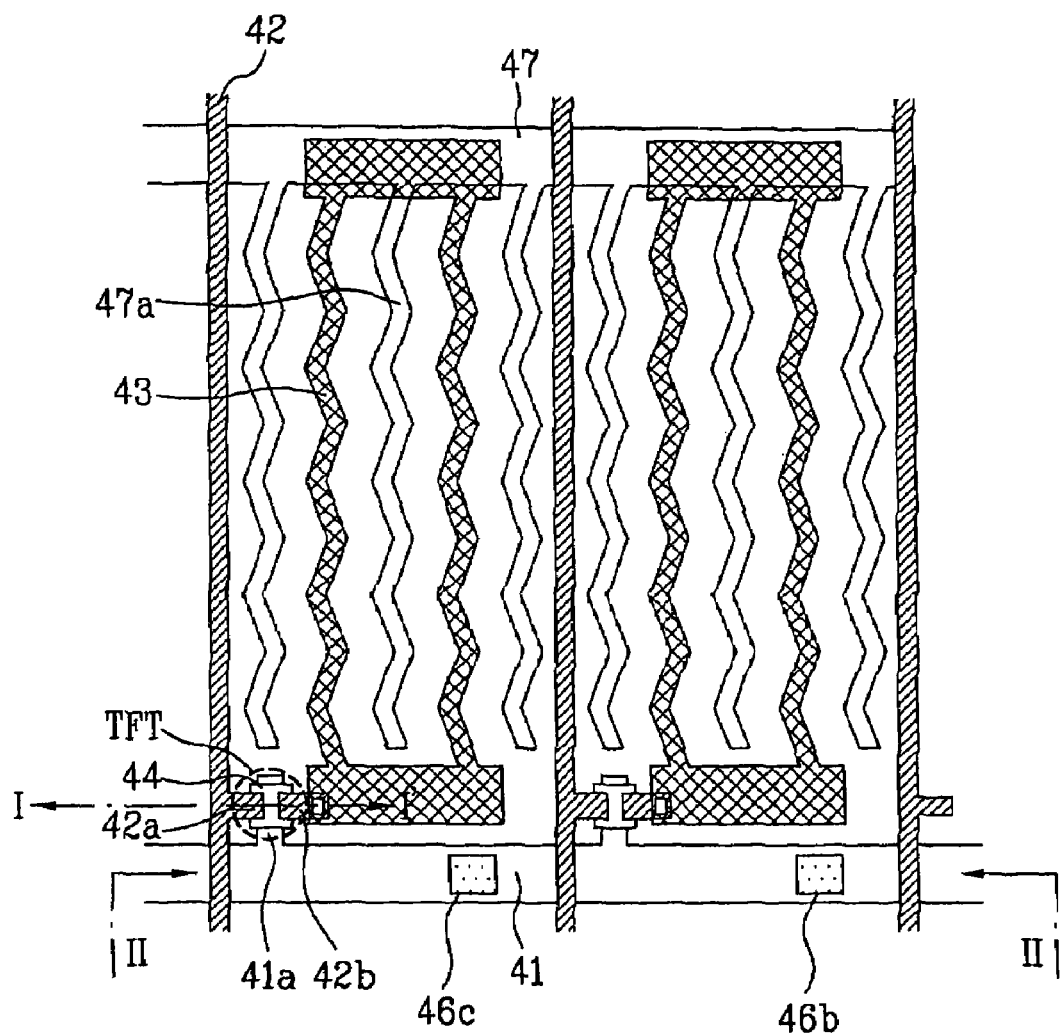
FIG. 9 is a plan diagram illustrating another liquid crystal display device according to the present invention.
Figure 10:
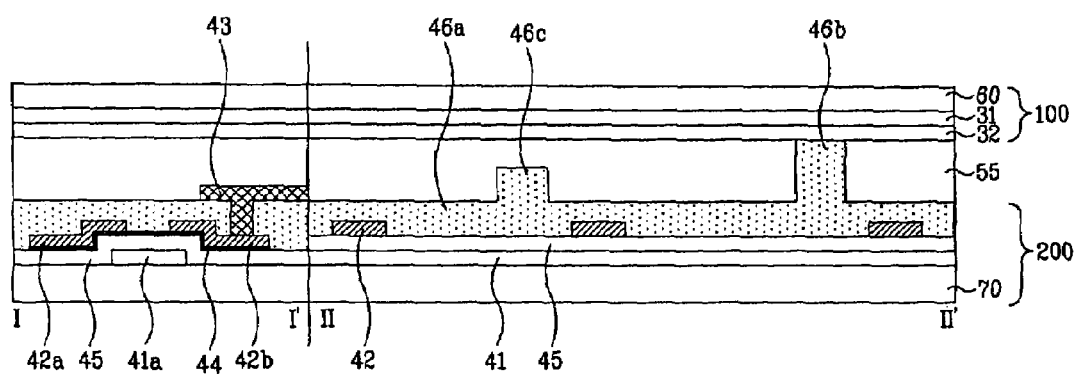
FIG. 10 is a cross section diagram illustrating a liquid crystal display device according to the fourth embodiment of the present invention, along I-I' and II-II' of FIG. 9.

FIG. 9 is a plan diagram illustrating another liquid crystal display device according to the present invention. FIG. 10 is a cross section diagram illustrating a liquid crystal display device according to the fourth embodiment of the present invention, along I-I' and II-II' of FIG. 9.

As shown in FIGS. 9 and 10, the liquid crystal display device according to the fourth embodiment of the present invention includes a color filter substrate 100, a TFT substrate 200, and a liquid crystal layer 55 formed by injecting liquid crystal into a space between the color filter substrate 100 and the TFT substrate 200.

The color filter substrate 100 includes a substrate 60, a black matrix layer 31, an R/G/B color filter layer 32, and an overcoat layer (not shown). The TFT substrate 200 positioned in opposite to the color filter substrate 100 includes a substrate 70, a gate line 41, a data line 42, a common line 47, a common electrode 47a, source and drain electrodes 42a and 42b, a pixel electrode 43, a gate insulation film 45, and a semiconductor layer 44. The substrates 60 and 70 may be formed of glass or plastic.

In addition, a passivation film 46a is formed between the thin film transistor TFT and the pixel electrode 43. Simultaneously, first and second column spacers 46b and 46c are formed of the same material as the passivation film 46a. The first column spacer 46b corresponds to a cell-gap column spacer to maintain a cell gap between the two substrates, wherein the first column spacer 46b is brought into contact with the color filter substrate 100. The second column spacer 46b is provided to prevent a liquid crystal panel from being compressed, wherein the second column spacer 46b has such a height as not to contact with the color filter substrate 100 when the liquid crystal panel is not compressed. Accordingly, the liquid crystal display device according to the fourth embodiment of the present invention is provided with dual column spacers including the first and second column spacers 46b and 46c to maintain the cell gap and to prevent the liquid crystal panel from being compressed.

The passivation film 46a and the first and second column spacers 46b and 46c are formed as an integral body by depositing an organic insulation material of ultra-violet curable liquid pre-polymer on the substrate 70 including the thin film transistor TFT, and carrying out In-Plane Printing using a soft mold provided with a pattern having an inverted shape of the passivation film 46a and the first and second column spacers 46b and 46c.

Accordingly, the liquid crystal display device according to the fourth embodiment of the present invention includes the passivation film 46a and the first and second column spacers 46b and 46c which are formed by the In-Plane Printing using the soft mold. In comparison to a related art process of forming a column spacer by photolithography using coating, exposure and development of photoresist, the In-Plane Printing using the soft mold can realize a simpler process with decreased fabrication cost.

A method of fabricating the liquid crystal display device according to the fourth embodiment of the present invention will be explained with reference to FIGS. 11A to 11D.

Figure 11A:
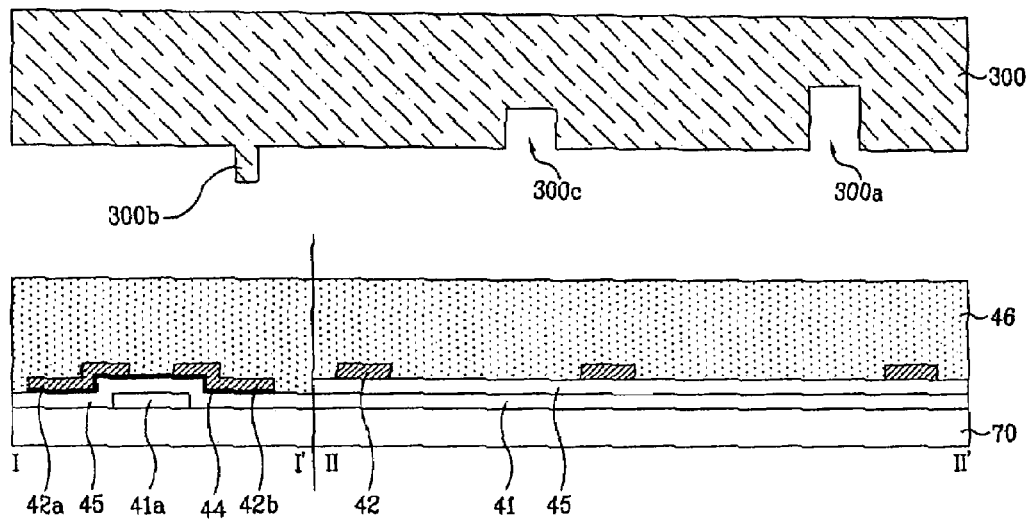
FIGS. 11A to 11D are cross section diagrams illustrating a method of fabricating a liquid crystal display device according to the fourth embodiment of the present invention.

As shown in FIG. 11A, a gate pattern including the gate line 41 and a gate electrode 41a, the gate insulation film 45; the semiconductor layer 44, and source/drain patterns including the data line 42 and the source and drain electrodes 42a and 42b are formed on the substrate 70.

Thereafter, a soft mold 300 is prepared having a rear surface provided with a backplane and a front surface provided with embossing patterns 300b and depressed patterns 300a and 300c and positioned above the substrate 70 including the pattern material layer 46. The soft mold 300 is provided with the embossing pattern 300b for formation of the contact hole, and the depressed pattern 300a and 300c for formation of the first and second column spacers 46b and 46c.

Figure 11B:
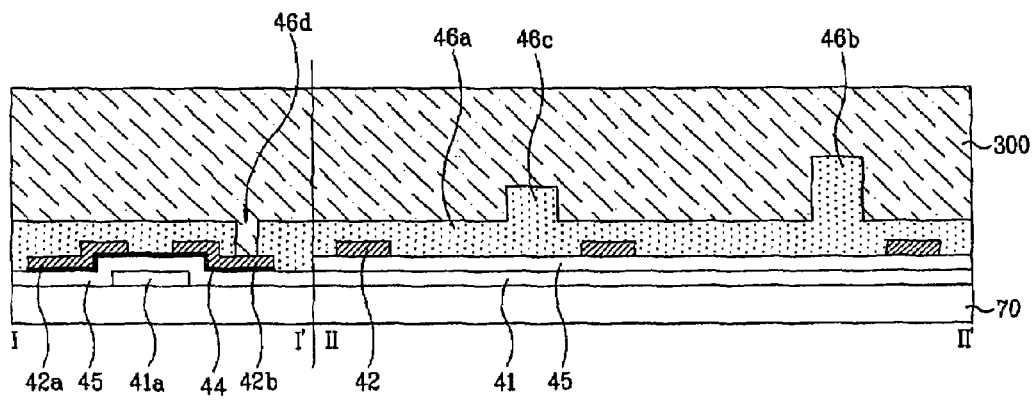

As shown in FIG. 11B, after aligning the soft mold 300 and the substrate 70 having the pattern material layer 46, the surface of soft mold 300 is brought into contact with the pattern material layer 46, thereby forming the passivation film 46a, the first and second column spacer 46b and 46c, and the contact hole 46d for exposing the drain electrode 42b in the pattern material layer 46, wherein the first and second column spacer 46b and 46c correspond to the depressed patterns 300a and 300c of the soft mold 300, and the contact hole 46d corresponds to the embossing pattern 300b of the soft mold 300. While the soft mold 300 is in contact with the pattern material layer 46, heat or light is applied thereto to thereby cure the pattern material layer 46. The first column spacer 46b has such a height as to contact the color filter substrate 100. The second column spacer 46c has such a height as not to contact with the color filter substrate 100, wherein the second column spacer 46c prevents the liquid crystal panel from being compressed.

Figure 11C:
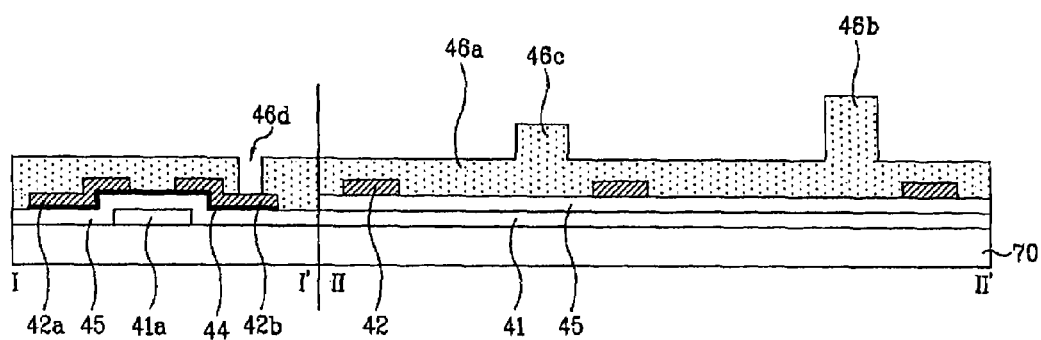

As shown in FIG. 11C, the soft mold 300 is separated from the passivation film 46a having the contact hole 46d and the pattern material layer 46 having the first and second column spacers 46b and 46c.

Figure 11D:
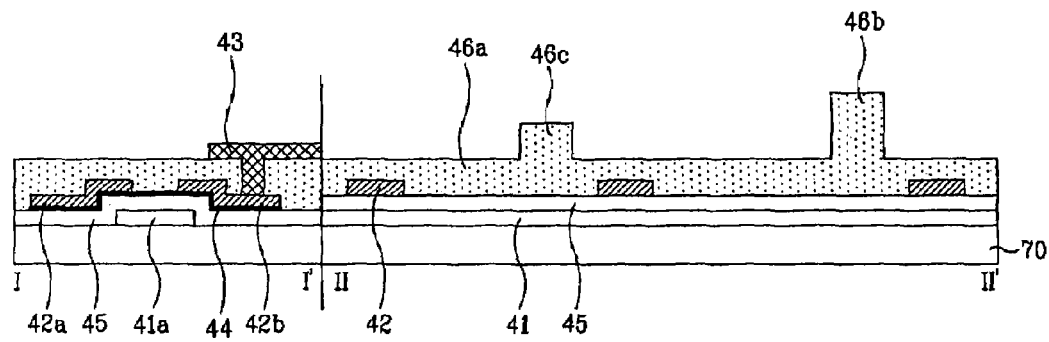

Next, as shown in FIG. 11D, a transparent conductive film is formed on the passivation film 46a having the contact hole 46d, and is then patterned by photolithography, thereby forming the pixel electrode 43 connected to the drain electrode 42b.

Accordingly, the liquid crystal display device according to the fourth embodiment of the present invention includes the passivation film 46a and the first and second column spacers 46b and 46c formed by In-Plane Printing using the soft mold. In comparison to a related art process of forming a column spacer by photolithography using coating, exposure and development of photoresist, the In-Plane Printing using the soft mold can realize a simpler process with decreased fabrication cost.

A liquid crystal display device provided with a passivation film having a dual-layered structure, a cell-gap column spacer 46b and a compression prevention column spacer 46c and a method of fabricating the same will be explained with reference to the accompanying drawings.

Figure 12:
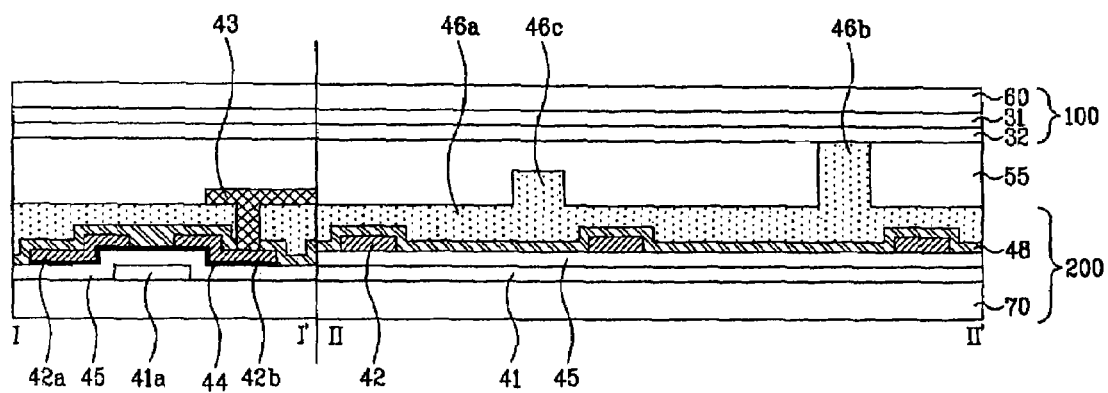
FIG. 12 is a cross section diagram illustrating a liquid crystal display device according to the fifth embodiment of the present invention, along I-I' and II-II' of FIG. 9.

FIG. 12 is a cross section diagram illustrating a liquid crystal display device according to the fifth embodiment of the present invention, along I-I' and II-II' of FIG. 9.

As shown in FIGS. 9 and 12, the liquid crystal display device according to the fifth embodiment of the present invention includes a color filter substrate 100, a TFT substrate 200, and a liquid crystal layer 55 formed by injecting liquid crystal into a space between the color filter substrate 100 and the TFT substrate 200.

The color filter substrate 100 includes a substrate 60, a black matrix layer 31, an R/G/B color filter layer 32, and an overcoat layer (not shown). The TFT substrate 200 positioned in opposite to the color filter substrate 100 includes a substrate 70, a gate line 41, a data line 42, a common line 47, a common electrode 47a, source and drain electrodes 42a and 42b, a pixel electrode 43, a gate insulation film 45, and a semiconductor layer 44. The substrates 60 and 70 may be formed of glass or plastic.

In addition, first and second passivation films 48 and 46a are formed between the pixel electrode 43 and the thin film transistor TFT, and simultaneously first and second column spacers 46b and 46c are formed of the same material as the second passivation film 46a. The first column spacer 46b corresponds to a cell-gap column spacer to maintain a cell gap between the two substrates, wherein the first column spacer 46b is brought into contact with the color filter substrate 100. The second column spacer 46c is provided to prevent a liquid crystal panel from being compressed, wherein the second column spacer 46c has such a height as not to contact with the color filter substrate 100. Accordingly, the liquid crystal display device according to the fifth embodiment of the present invention is provided with dual column spacers including the first and second column spacers 46b and 46c to maintain the cell gap and to prevent the liquid crystal panel from being compressed.

The first passivation film 48 is formed of an inorganic insulation material such as $SiN_x$, to thereby improve the interfacial stability between the second passivation film 46a of organic insulation material including photo ultra-violet curable liquid pre-polymer and the source and drain electrodes 42a and 42b/data line 42/gate insulation film 45. Additionally the second passivation film 46a and the first and second column spacers 46b and 46c are formed as an integral body by depositing an organic insulation material of ultra-violet curable liquid pre-polymer on the substrate 70 including the thin film transistor TFT, and carrying out In-Plane Printing using a soft mold provided with a pattern having an inverted shape of the second passivation film 46a and the first and second column spacers 46b and 46c.

Accordingly, the liquid crystal display device according to the fifth embodiment of the present invention includes the second passivation film 46a and the first and second column spacers 46b and 46c which are formed by the In-Plane Printing using the soft mold. In comparison to a related art process of forming a column spacer by photolithography using coating, exposure and development of photoresist, the In-Plane Printing using the soft mold can realize a simpler process with decreased fabrication cost. Furthermore, the first passivation film 48 of inorganic insulation material is formed under the second passivation film 46a of organic insulation material, thereby improving the interfacial stability between the second passivation film 46a and the contacting layers.

A method of fabricating the liquid crystal display device according to the fifth embodiment of the present invention will be explained with reference to FIGS. 13A to 13E.

Figure 13A:
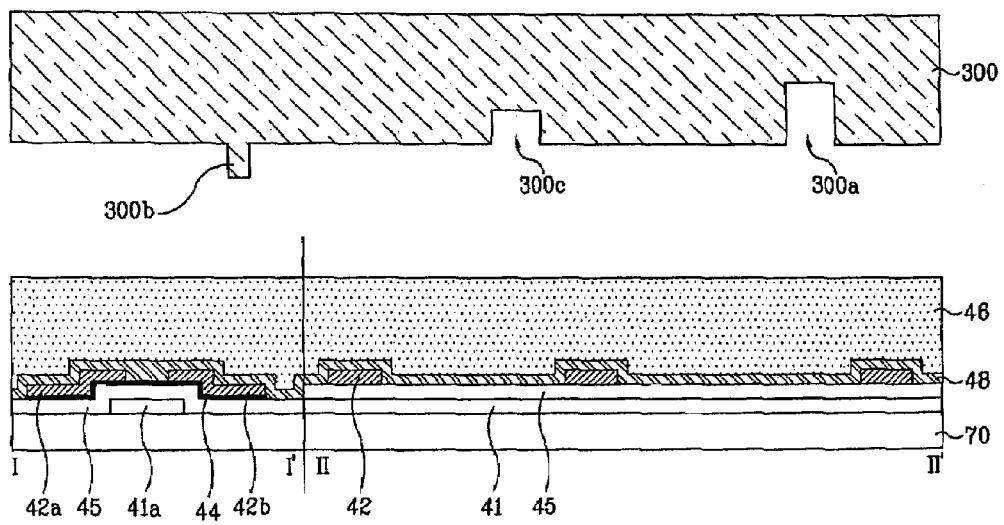
FIGS. 13A to 13E are cross section diagrams illustrating a method of fabricating a liquid crystal display device according to the fifth embodiment of the present invention.

As shown in FIG. 13A, there are a gate pattern including the gate line 41 and a gate electrode 41a; the gate insulation film 45; the semiconductor layer 44; and source/drain patterns including the data line 42 and the source and drain electrodes 42a and 42b on the substrate 70. The first passivation film 48 of inorganic insulation material, for example, $SiN_x$ is formed on the substrate 70 including the source/drain patterns, and a pattern material layer 46 is formed on the first passivation film 48.

Thereafter, a soft mold 300 is prepared having a rear surface provided with a backplane and a front surface provided with embossing patterns 300b and depressed patterns 300a and 300c and positioned above the substrate 70 including the pattern material layer 46. The soft mold 300 is provided with the embossing pattern 300b for formation of the contact hole, and the depressed pattern 300a and 300c for formation of the first and second column spacers.

Figure 13B:
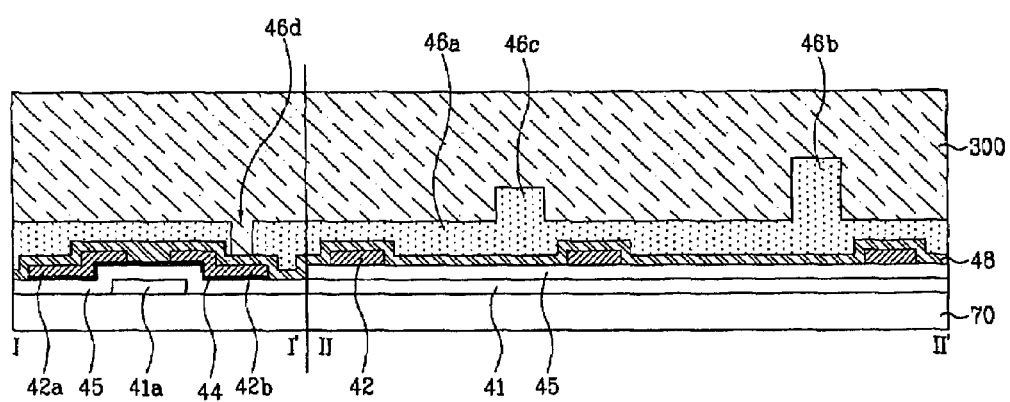

As shown in FIG. 13B, after aligning the soft mold 300 and the substrate 70 having the pattern material layer 46, the surface of soft mold 300 is brought into contact with the pattern material layer 46, thereby forming the second passivation film 46a, the first and second column spacer 46b and 46c, and the contact hole 46d for exposing the drain electrode 42b in the pattern material layer 46, wherein the first and second column spacers 46b and 46c correspond to the depressed patterns 300a and 300c of the soft mold 300, and the contact hole 46d corresponds to the embossing pattern 300b of the soft mold 300. While the soft mold 300 is in contact with the pattern material layer 46, heat or light is applied thereto to thereby cure the pattern material layer 46.

The first column spacer 46b corresponds to the cell-gap column spacer to maintain the cell gap between the two substrates, wherein the first column spacer 46b is brought into contact with the color filter substrate 100. The second column spacer 46c is provided to prevent the liquid crystal panel from being compressed, wherein the second column spacer 46c has such a height as not to contact with the color filter substrate 100.

Figure 13C:
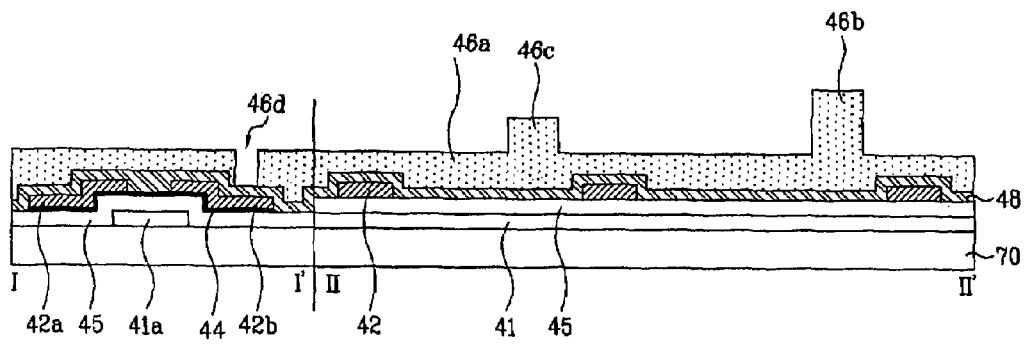

Next, as shown in FIG. 13C, the soft mold 300 is separated from the second passivation film 46a having a hole 46e corresponding to the contact hole and the pattern material layer 46 having the first and second column spacers 46b and 46c.

Figure 13D:
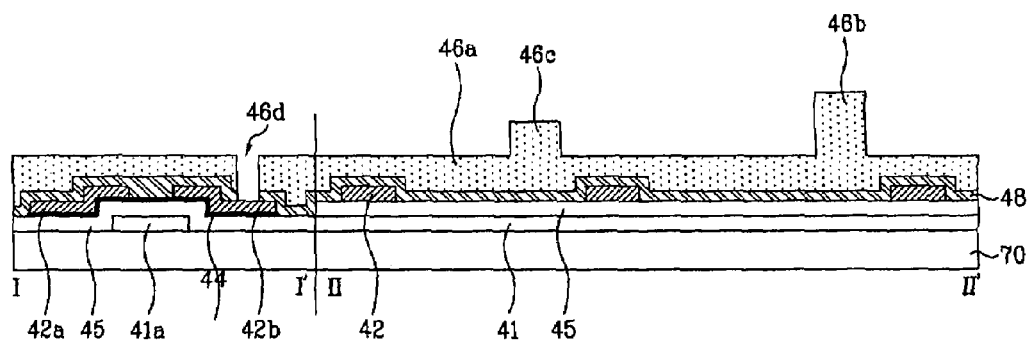

As shown in FIG. 13D, an etching process is performed using the second passivation film 46a having the hole 46e corresponding to the contact hole as an etching mask, thereby forming the contact hole 46d for exposing the drain electrode 42b.

Figure 13E:
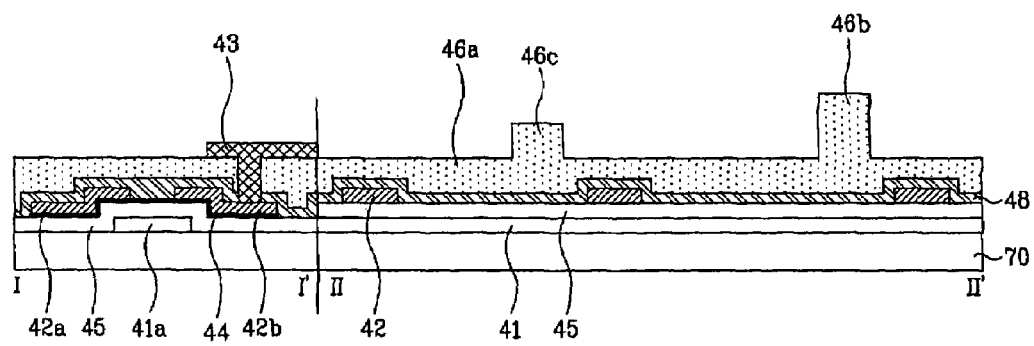

As shown in FIG. 13E, a transparent conductive film is formed on the second passivation film 46a including the contact hole 46d, and is then patterned by photolithography, thereby forming the pixel electrode 43 connected to the drain electrode 42b and completing the process.

Accordingly, the liquid crystal display device according to the fifth embodiment of the present invention includes the second passivation film 46a and the first and second column spacers 46b and 46c formed by In-Plane Printing using the soft mold. In comparison to a related art process of forming a column spacer by photolithography using coating, exposure and development of photoresist, the In-Plane Printing using the soft mold can realize a simpler process with decreased fabrication cost. Furthermore, the first passivation film 48 of inorganic insulation material is formed under the second passivation film 46a of organic insulation material, whereby the interfacial stability improves between the second passivation film 46a of organic insulation material and the contacting layers.

A liquid crystal display device provided with a passivation film having a three-layered structure, a cell-gap column spacer 46b and a compression prevention column spacer 46c and a method of fabricating the same will be explained as follows.

Figure 14:
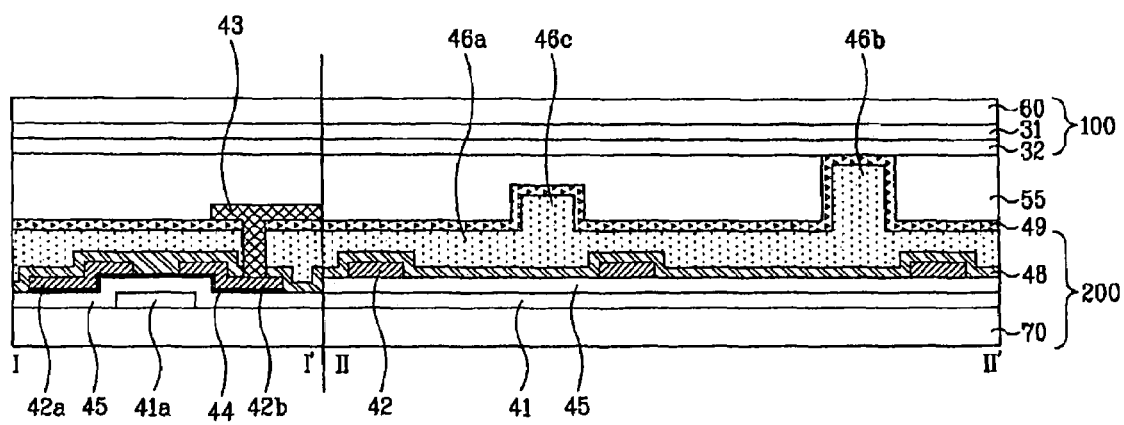
FIG. 14 is a cross section diagram illustrating a liquid crystal display device according to the sixth embodiment of the present invention, along I-I' and II-II' of FIG. 9.

FIG. 14 is a cross section diagram illustrating a liquid crystal display device according to the sixth embodiment of the present invention, along I-I' and II-II' of FIG. 9.

As shown in FIGS. 9 and 14, the liquid crystal display device according to the sixth embodiment of the present invention includes a color filter substrate 100, a TFT substrate 200, and a liquid crystal layer 55 formed by injecting liquid crystal into a space between the color filter substrate 100 and the TFT substrate 200.

The color filter substrate 100 includes a substrate 60, a black matrix layer 31, an R/G/B color filter layer 32, and an overcoat layer (not shown). The TFT substrate 200 positioned in opposite to the color filter substrate 100 includes a substrate 70, a gate line 41, a data line 42, a common line 47, a common electrode 47a, source and drain electrodes 42a and 42b, a pixel electrode 43, a gate insulation film 45, and a semiconductor layer 44. The substrates 60 and 70 may be formed of glass or plastic.

In addition, a first passivation film 48, a second passivation film 46a and a third passivation film 49 are formed between the pixel electrode 43 and the thin film transistor TFT, and simultaneously with forming the second passivation film 46a, first and second column spacers 46b and 46c are formed of the same material as the second passivation film 46a. The first column spacer 46b corresponds to a cell-gap column spacer to maintain a cell gap between the two substrates, wherein the first column spacer 46b is brought into contact with the color filter substrate 100. The second column spacer 46c is provided to prevent a liquid crystal panel from being compressed, wherein the second column spacer 46c has such a height as not to contact the color filter substrate 100.

The first and third passivation films 48 and 49 are formed of an inorganic insulation material such as $SiN_x$. The first passivation film 48 improves the interfacial stability between the second passivation film 46a of organic insulation material including photo ultra-violet curable liquid pre-polymer and the source and drain electrodes 42a and 42b/data line 42/gate insulation film 45. In addition, the third passivation film 49 improves the interfacial stability between the pixel electrode 43 and the second passivation film 46a.

The second passivation film 46a and the first and second column spacers 46b and 46c are formed as an integral body by depositing an organic insulation material of ultra-violet curable liquid pre-polymer on the substrate 70 including the thin film transistor TFT, and carrying out In-Plane Printing using a soft mold provided with a pattern having an inverted shape of the second passivation film 46a and the first and second column spacers 46b and 46c.

Accordingly, the liquid crystal display device according to the sixth embodiment of the present invention includes the second passivation film 46a and the first and second column spacers 46b and 46c which are formed by the In-Plane Printing using the soft mold. In comparison to a related art process of forming a column spacer by photolithography using coating, exposure and development of photoresist, the In-Plane Printing using the soft mold can realize a simpler process with decreased fabrication cost. Furthermore, the first and third passivation films 48 and 49 of inorganic insulation material are respectively formed on and under the second passivation film 46a of organic insulation material, thereby improving the interfacial stability between the second passivation film 46a and the contacting layers.

Figure 15A:
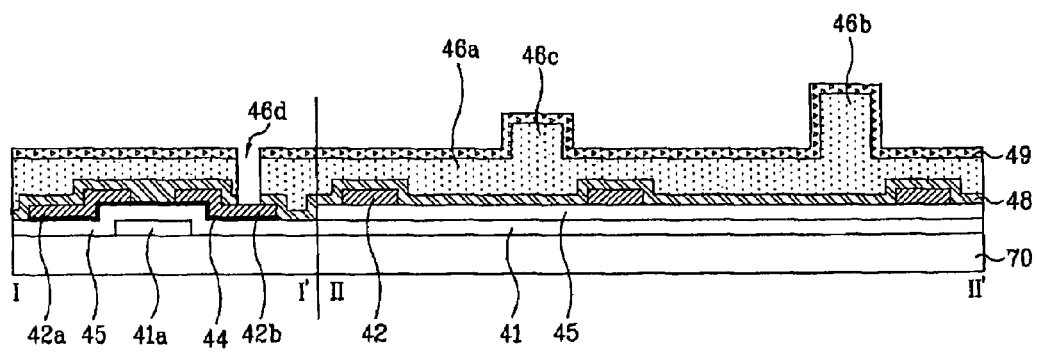
FIGS. 15A and 15B are cross section diagrams illustrating a method of fabricating a liquid crystal display device according to the sixth embodiment of the present invention.
Figure 15B:
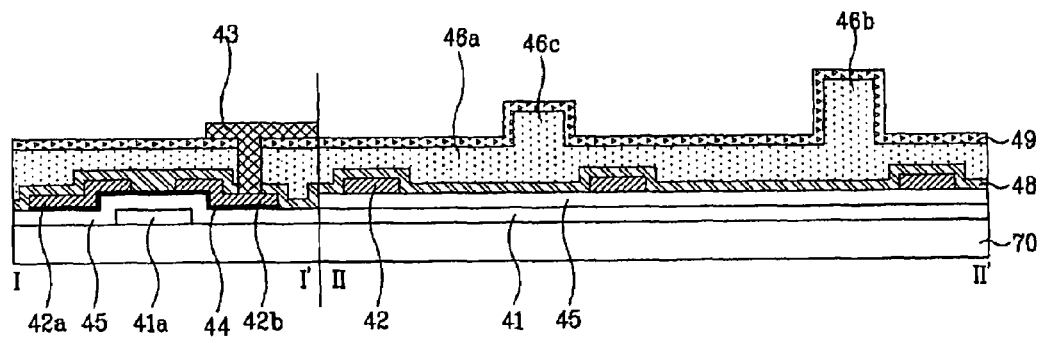

FIGS. 15A and 15B are cross section diagrams illustrating a method of fabricating a liquid crystal display device according to the sixth embodiment of the present invention.

The process until forming the column spacer 46b, the passivation film 46a, the first and second column spacers 46b and 46c and the contact hole 46d for exposing the drain electrode 42b is same as the process of FIGS. 13A to 13D according to the fifth embodiment of the present invention. Thereafter, as shown in FIG. 15A, the third passivation film 49 of inorganic insulation material, for example, $SiN_x$ is formed on the second passivation film 46a.

Then, as show in FIG. 15B, a transparent conductive film is formed on the substrate 70 including the contact hole 46d, and is then patterned by photolithography, thereby forming the pixel electrode 43 connected to the drain electrode 42b.

Accordingly, the liquid crystal display device according to the sixth embodiment of the present invention includes the second passivation film 46a and the first and second column spacers 46b and 46c formed by In-Plane Printing using the soft mold. In comparison to a related art process of forming a column spacer by photolithography using coating, exposure and development of photoresist, the In-Plane Printing using the soft mold can realize a simpler process with decreased fabrication cost. Furthermore, the first and third passivation films 48 and 49 of inorganic insulation material are respectively formed above and below the second passivation film 46a of organic insulation material, whereby the interfacial stability is improved between the second passivation film 46a of organic insulation material and the contacting layers.

As mentioned above, liquid crystal display devices according to the present invention and the method of fabricating the same may have the following advantages.

The liquid crystal display device according to the present invention includes the passivation film and the column spacer which are formed by In-Plane Printing using the soft mold. In comparison to a related art process of forming a column spacer by photolithography using coating, exposure and development of photoresist, the In-Plane Printing using the soft mold can realize a simpler process with decreased fabrication cost.

In the liquid crystal display device according to the present invention, one or more passivation films of inorganic insulation material may be formed between the passivation film of organic insulation material and the contacting layers, thereby improving the interfacial stability between the passivation film of organic insulation material and the contacting layers.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of fabricating a liquid crystal display device comprising:
    preparing a first substrate having a color filter and a black matrix layer;
    forming a thin film transistor on a second substrate facing the first substrate;
    forming a pattern material layer on the second substrate including the thin film transistor;
    aligning a soft mold with the second substrate including the pattern material layer;
    forming a contact hole, a passivation film, a first column spacer and a second column spacer by contacting the soft mold with the pattern material layer, wherein the second column spacer has a height lower than the first column spacer;
    separating the soft mold from the pattern material layer; and
    forming a pixel electrode that connects to the thin film transistor via the contact hole,
    wherein an entire area of the second column spacers is formed to overlap with the black matrix layer.

2. The method of claim 1, wherein the pattern material layer is formed of an organic insulation material including ultra-violet curable liquid pre-polymer, photo-initiator and surfactant.

3. The method of claim 1, wherein the soft mold is provided with embossing patterns for formation of the contact hole, and depressed patterns for formation of the first and second column spacers.

4. The method of claim 3, wherein the soft mold is formed of any one of polydimethylsiloxane, polyurethane and polyimide.

5. The method of claim 1, wherein the first column spacer has a height above the second substrate to contact the first substrate.

6. A method of fabricating an array substrate for a liquid crystal display device comprising:
- forming a thin film transistor connected to gate and data lines on a substrate;
- forming a pattern material layer on the substrate in including the thin film transistor;
- aligning a soft mold with the substrate including the pattern material layer;
- forming a contact hole, a passivation film, a first column spacer and a second column spacer by contacting the soft mold to the pattern material layer, wherein the second column spacer has a height lower than the first column spacer;
- separating the soft mold from the pattern material layer; and
- forming a pixel electrode that connects to the thin film transistor via the contact hole,
- wherein an entire area of the second column spacers is formed to overlap with the gate line.

* * * * *